(12) United States Patent
Chen

(10) Patent No.: US 6,196,314 B1
(45) Date of Patent: Mar. 6, 2001

(54) INSOLUBLE SALT CONTROL SYSTEM AND METHOD

(75) Inventor: James C. T. Chen, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/250,237

(22) Filed: Feb. 15, 1999

(51) Int. Cl.$^7$ .............................. E21B 43/16; E21B 43/20
(52) U.S. Cl. .................. 166/275; 166/250.15; 166/306; 210/96.1; 210/696
(58) Field of Search .............................. 166/275, 252.1, 166/252.3, 252.4, 268, 250.01, 250.02, 250.07, 250.15, 53, 90.1, 313, 305.1; 210/696, 739, 96.1, 170

(56) References Cited

U.S. PATENT DOCUMENTS

| | | |
|---|---|---|
| 3,620,974 | 11/1971 | Stanford et al. . |
| 3,704,750 | 12/1972 | Miles et al. ........................... 166/279 |
| 3,965,003 | 6/1976 | Stanford et al. ........................ 210/58 |
| 4,537,684 | 8/1985 | Gallup et al. ......................... 210/696 |
| 4,580,627 * | 4/1986 | Argabright et al. ............. 166/275 X |
| 4,633,949 | 1/1987 | Crowe .................................. 166/279 |
| 4,723,603 | 2/1988 | Plummer ............................... 166/275 |
| 4,830,766 | 5/1989 | Gallup et al. . |
| 5,002,126 | 3/1991 | Carlberg et al. ...................... 166/279 |
| 5,073,270 | 12/1991 | Gallup et al. ......................... 210/698 |
| 5,263,541 | 11/1993 | Barthorpe et al. .................... 166/279 |
| 5,346,010 | 9/1994 | Adams et al. ......................... 166/279 |
| 5,363,915 * | 11/1994 | Marquis et al. ................. 166/275 X |
| 5,614,476 | 3/1997 | Young .................................. 507/239 |
| 5,622,919 | 4/1997 | Brezinski et al. ...................... 507/90 |
| 6,006,832 * | 12/1999 | Tubel et al. ................. 166/250.15 X |

FOREIGN PATENT DOCUMENTS 2 335 688 9/1999 (GB) .

OTHER PUBLICATIONS

Modern Petroleum A Basic Primer of the Industry, by B. Berger & K. Anderson, 3rd Ed., 1992, PennWell, 236–240.*

* cited by examiner

Primary Examiner—David Bagnell
Assistant Examiner—Kamal Dawelbeit
(74) Attorney, Agent, or Firm—Madan, Mossman & Sriram, P.C.

(57) ABSTRACT

The present invention provides a system and method for enhancing hydrocarbon production from a subsurface hydrocarbon-bearing formation. The system includes a mechanical fluid treatment unit that substantially reduces the concentration of precursor ions from the injection water. The treated water is injected under pressure into an injection well to cause the hydrocarbons to flow toward a production well. A chemical unit injects selected amounts of additives into the injection well to inhibit in-situ growth of crystals from insoluble salt precipitates formed due to the interaction of precursor ions present in the injected water and ions residents in the reservoir. The selected chemicals and their respective amounts are determined at least partially based on reservoir characteristics and the concentration of precursor ions in the treated water.

17 Claims, 2 Drawing Sheets

INSOLUBLE SALT CONTROL SYSTEM AND METHOD

BACKGROUND OF THE INVENTION

1. Field of the Invention

This invention relates to the production of hydrocarbons from subsurface formations and more particularly to a system and process for preventing plugging of formation fluid passageways caused by the accumulation of insoluble salts precipitates resulting from the interaction between precipitate precursor ions in injection water and resident cations in the subsurface formations.

2. Description of the Related Art

Hydrocarbons, such as oil and gas, are recovered from the earth's subsurface formations through production wellbores that penetrate hydrocarbon-bearing formations or reservoirs. Perforations are made from the production wellbore to the formation to facilitate flow of the hydrocarbons from the hydrocarbon-bearing formations to the production wellbores. Water is sometimes injected under pressure into injection zones formed in the subsurface formations to stimulate hydrocarbon production through the production wells in a field.

Water is injected by itself as a component of miscible or immiscible displacement fluids. Sea water (for offshore wells) and brine produced from the same or nearby formations (for onshore wells) are most commonly used as the water source. Such water usually contains large amounts (concentration) of precursor ions, such as divalent sulfate ($SO_4^-$), which form insoluble salts when they come in contact with cations, such as $Ba^{++}$, $Sr^{++}$ and $C^{++}$, resident in the formations. The resulting salts ($BaSO_4$, $SrSO_4$ and $CaSO_4$) can be relatively insoluble at subsurface formation temperature and pressure. Consequently, such salts precipitate out of the solution. The precipitation of the insoluble salts accumulates and consequently plugs the subsurface fluid passageways. The plugging effects are most severe in passageways in the formation near the injection wells and at the perforations of the production wells. Solubility of the insoluble salts further decreases as the injection water is produced to the surface through the production wells, due to the reduction of the temperature and pressure as the fluids move to the surface through the production wells.

For the purpose of this invention, subsurface or formation fluid passageways includes pores in the formation matrix, fractures, voids, cavities, vugs, perforations and fluid passages through the wells, including cased and uncased wells, tubings and other fluid paths in the wells. The term precipitates means insoluble salts, crystals or scale. The term plugging as used herein means reduction in the porosity and/or permeability of fluid passageways. The term injection water as used herein means any fluid containing water that is injected into a subsurface formation to facilitate recovery of hydrocarbons from subsurface formations.

Mechanical methods, such as passing the untreated water through a nano-filtration membrane, have been used to remove substantial amounts of the precursor ions from the water at the surface before injecting it into the wellbore. Sea water typically contains between 2700 to 2800 ppm of divalent $SO_4^-$. The nano-filtration membrane process usually reduces this concentration to between 50 and 150 ppm. Under many subsurface reservoir conditions, such a concentration of the precursor ions produces sufficient amounts of the insoluble salts to plug or seal the formation fluid passageways. Thus, the filtration of the injection water alone by nanofilters, in many cases, is not sufficient to prevent plugging of the subsurface formation passageways.

Chemicals or additives alone are often injected into the untreated water to inhibit the in-situ growth of crystals from insoluble salt precipitation. A variety of additives are injected into the injection water at the surface or directly into an injection well. Production wells are also often treated with back-flow of fresh brine containing additives to prevent plugging of the passageways. Use of chemicals alone can be cost-prohibitive, environmentally unfriendly, and not totally effective, especially when high concentrations of naturally-occurring cations are present in the subsurface formation.

The present invention provides a system and process which simultaneously utilize both a mechanical process and a chemical process to effectively control or prevent in-situ growth of crystals in the subsurface formation, thereby preventing the plugging of the formation fluid passageways.

SUMMARY OF THE INVENTION

The present invention provides a system and method for enhancing hydrocarbon production from a subsurface hydrocarbon-bearing formation (reservoir). The system includes a mechanical fluid treatment unit that substantially reduces the concentration of precursor ions from the injection water. The filtered water (also referred to herein as the "treated water") is injected under pressure into a zone of an injection well ("injection zone") to cause the hydrocarbons to flow toward a production well. A chemical control unit injects selected amounts of one or more additives into the treated water at the surface or into the injection zone or well to inhibit in-situ growth of crystals from insoluble salt precipitates formed due to the interaction of precursor ions present in the injected water and ions resident in the reservoir. The selected chemicals and their respective injection amounts are determined at least partially based on reservoir characteristics and the concentration of the precursor ions in the filtered water.

Injection well characteristics, reservoir characteristics and produced hydrocarbon characteristics are determined during the injection process. One or more of such characteristics are then utilized to determine the types of additives and their respective amounts that will continue to inhibit in-situ growth of crystals. These chemicals are then injected into the injection zone. Such adjustments to the chemical injection process are made on an ongoing basis to continuously prevent the accumulation of insoluble salt precipitates in the formation fluid passageways, thereby preventing plugging of such passageways during the injection process. Prediction models are utilized to determine the required chemicals, their respective amounts, and the timing of their injection into the injection wells.

Examples of the more important features of the invention have been summarized above rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For a detailed understanding of the present invention, reference should be made to the following detailed description of the preferred embodiment, taken in conjunction with the accompanying drawings, in which like elements have been given like numerals, wherein.

DETAILED DESCRIPTION OF THE PREFERRED EMBODIMENTS

The present invention provides a welisite system and process (i) for removing precursor ions from substantially untreated water, which precursor ions can form insoluble salt precipitates when they come in contact with certain resident ions in the subsurface formations, and (ii) controlling the injection of selected chemicals to inhibit in-situ growth of crystals from insoluble salts precipitation in the subsurface formations to prevent plugging of the formation passageways during the injection of water into an injection well. The system and method of the present invention substantially reduce the precipitates which would normally accumulate and plug or clog subsurface fluid passageways and perforations in the production wells. The system is especially useful when substantially untreated water, such as sea water, is used to stimulate hydrocarbon recovery through one or more associated production wellbores. As described above, subsurface fluid passageways or passages include any pores in the formation that allow fluids such as water and hydrocarbons to flow therethrough as well as any artificially created passages, such as perforations made in the wellbores to recover hydrocarbons.

Figure 1:
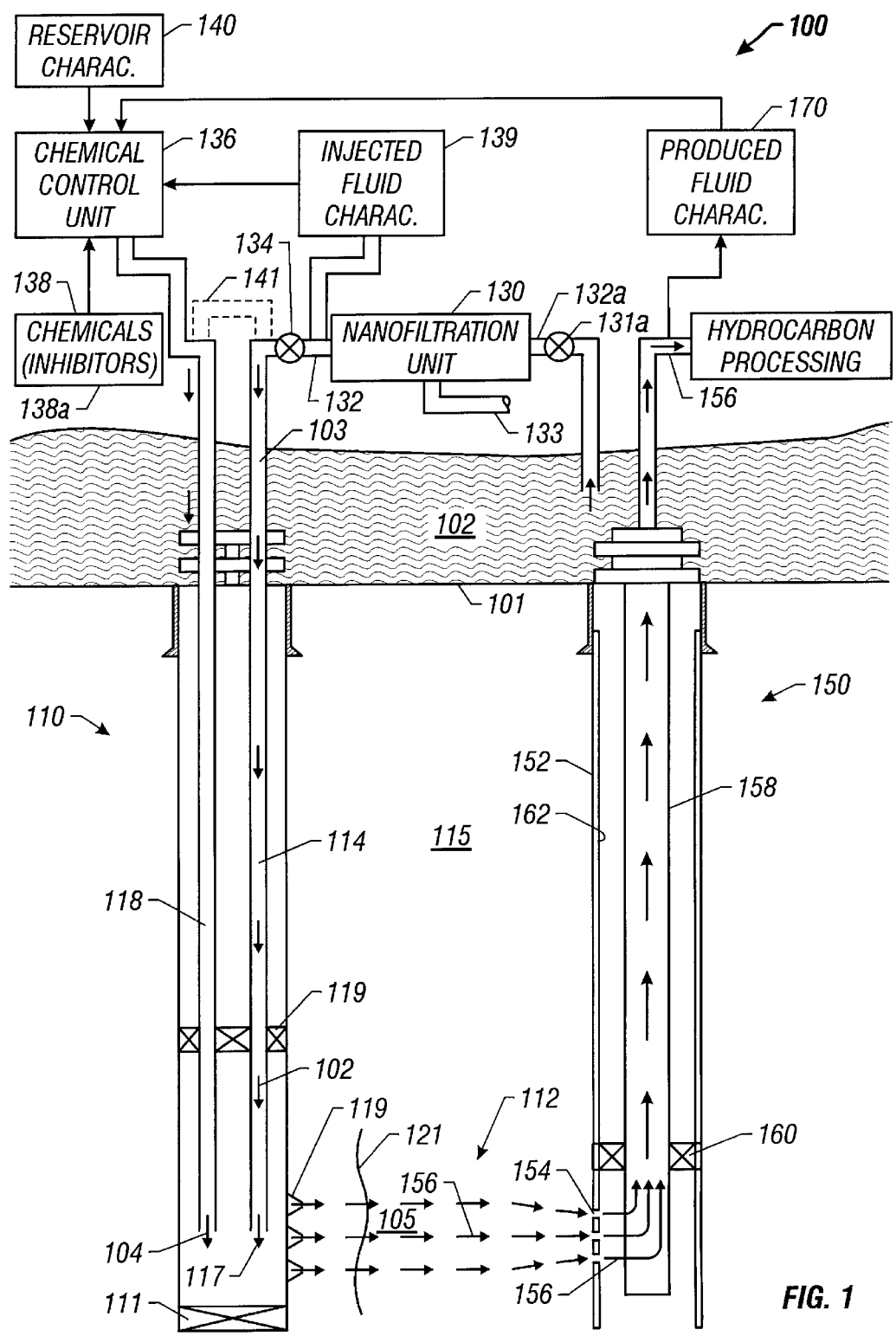
FIG. 1 is a schematic of a system for treating injection water and selectively introducing additives to prevent the formation of insoluble salt precipitates in subsurface formations and in the wellbores according to one embodiment of the present invention.

FIG. 1 shows a wellsite system 100 for mechanically treating substantially untreated injection water to substantially reduce the concentration of precursor ions in the injection water and to controllably supply desired chemicals (also referred to herein as "additives") to an injection well to inhibit in-situ growth of crystals (insoluble salt precipitates) which are formed due to the interaction of precursor ions present in the water and certain cations present in the subsurface formations. As noted above, this prevents the plugging of the formation passageways which would otherwise occur due to the accumulation of the insoluble salt precipitates.

The system 100 shows an injection well 110 which penetrates a subsurface formation 115 to a known depth 111. The well 110 is shown to have a water injection conduit 114 for supplying water under pressure to an injection zone 117 adjacent a reservoir or production zone 112. In the system 100, the injection well 110 is a subsea well formed from the sea bed 101 and wherein sea water 102 is used as the source of the injection water. The system 100, however, is equally applicable to land wellbores wherein brine or another suitable fluid is utilized as the source of water. A conduit 118 from the surface supplies desired chemicals into the injection zone 117. A packing element 119 placed in the injection well 110 prevents back-flow of the injected water 103 and chemicals 104 and allows maintenance of the desired pressure in the injection zone 117.

The system 100 also shows a production well 150, located spaced apart from the injection well 110. The production well 150 usually has a metal liner 152 with perforations 154 adjacent the reservoir 112. The perforations 154 allow formation fluid 156, such as hydrocarbons, to flow from the production zone 112 to the production well 150. A production tubing 158 placed inside the liner 152 facilitates the flow of the formation fluid 156 to the surface. A packer 160 placed above the perforations 154 to prevent flow of the fluid through the annulus 162 between the liner 152 and the tubing 158.

The primary purpose of injection wells is to aid the flow of hydrocarbons from the reservoir to their associated production wells. As noted above, one common method is to inject water under pressure adjacent to a production zone to cause the hydrocarbons trapped in the formation to move toward the production wells. However, commonly used water, such as sea water or brine, contains excessive levels (concentrations) of precursor ions, such as $SO_4^-$. Such precursor ions interact with $Ba^{++}$, $Sr^{++}$ and $Ca^{++}$ and other naturally present ions in the formations to form insoluble salts, such as Ba $SO_4$, Sr $SO_4$ and Ca $SO_4$, etc. Such salts precipitate out of the solution and, if present in excessive amounts, tend to accumulate in the subsurface passageways and in the wellbore perforations, thereby plugging the passageways and perforations. This plugging inhibits the flow of hydrocarbons through the formation and through the production wells. The plugging effects tend to be most severe in the formation passageways near the production wells. Thus, it is important to have a wellsite system that will prevent such pluggings.

Referring back to FIG. 1, in the present invention, the injection water 102 is first mechanically treated to remove a substantial amount of the precursor ions. The injection water 102 is passed through a filtration unit 130, which houses a suitable nano-filtration membrane (not shown). The water 102 is pumped by a pump 131 at a feed side 131a of the unit 130 at a pressure greater than the osmotic pressure of the untreated injection water 102. The membrane in the unit 130 prevents the passage of relatively large amounts of the precursor ions therethrough. The filtered or treated water 103 is recovered at the side 132 of the membrane opposite the feed side 131a. The precursor ions remain on the feed side 131a to form a brine having a much higher concentration of precursor ions than injection water 102. The brine is discharged from the unit 130 at a suitable location 133 and disposed.

The filtered water 103 has a substantially lower concentration of the precursor ions than the feed water 102. For example, precursor ion concentration in the sea water 102 is typically between 2700 and 2800 ppm. The concentration of the precursor ions in the filtered water 103 is usually between 50 to 150 ppm when a nanofilter made from a composite material is utilized as the membrane. Any other suitable nanofilter may be utilized for the purpose of this invention. The nano-filtration membrane units are commercially available and are thus not described herein in greater detail. The filtered water 103 is injected into the injection well 110 by a suitable pump 134 via the conduit 114.

Still referring to FIG. 1, in one method, one or more chemicals 104 from a supply unit 138 are selectively injected into the wellbore 110 via line 118. Alternatively, the chemicals may be injected into the filtered water 103 as shown by the dotted conduit 141. In this way, the mixture of the filtered water 103 and the chemicals 104 is then injected into the well 110 via the conduit 118. A chemical control unit 136 controls the supply of the chemicals 104. In the present invention, the types of chemicals and their respective amounts and timing of their injection are determined based on the characteristics 139 of the filtered water 103 (such as concentration of the precursor ions) and the reservoir characteristics (such as the concentration of the resident ions, reservoir pressure, reservoir temperature, porosity of the formation 112, and permeability of the formation 112) and any other desired parameter. The present invention utilizes one or more prediction reservoir models to determine the chemicals and their amounts.

The filtered water 103 and the chemicals 104 discharged into the injection zone 117 move into the reservoir or production zone 112 via perforations 119 in the form of a flood wall 121. This action causes the hydrocarbons 156 to move toward the production well 150. As the injection process continues, the flood wall 121 continues to move toward the well 150, slowly displacing the hydrocarbons 156 in the formation 112. The in-situ growth of the crystals is, to varying degree, a function of the displacement. In the present invention, the prediction models take into account such characteristics in determining the type and amounts of additives to be injected. As the injection process continues, the production well starts to produce a mixture of the hydrocarbons 156 and the injected fluids (water 103 and chemicals 104).

In the present system 100, the produced fluid 156 is tested to determine its characteristics 170, which may include the concentration of the insoluble salt precipitates. Other parameters measured may include production well parameters, such as pressure and fluid flow rate. The produced fluid parameters 170 and the production well parameters are then utilized by the prediction models of the system 100 to determine the types, quantities and timing of the injection of chemicals 104. Thus, the system 100 monitors (periodically or continuously) the effectiveness of the injection process and in response thereto controls injection of chemicals 104 to prevent plugging of the formation fluid passageways.

Figure 2:
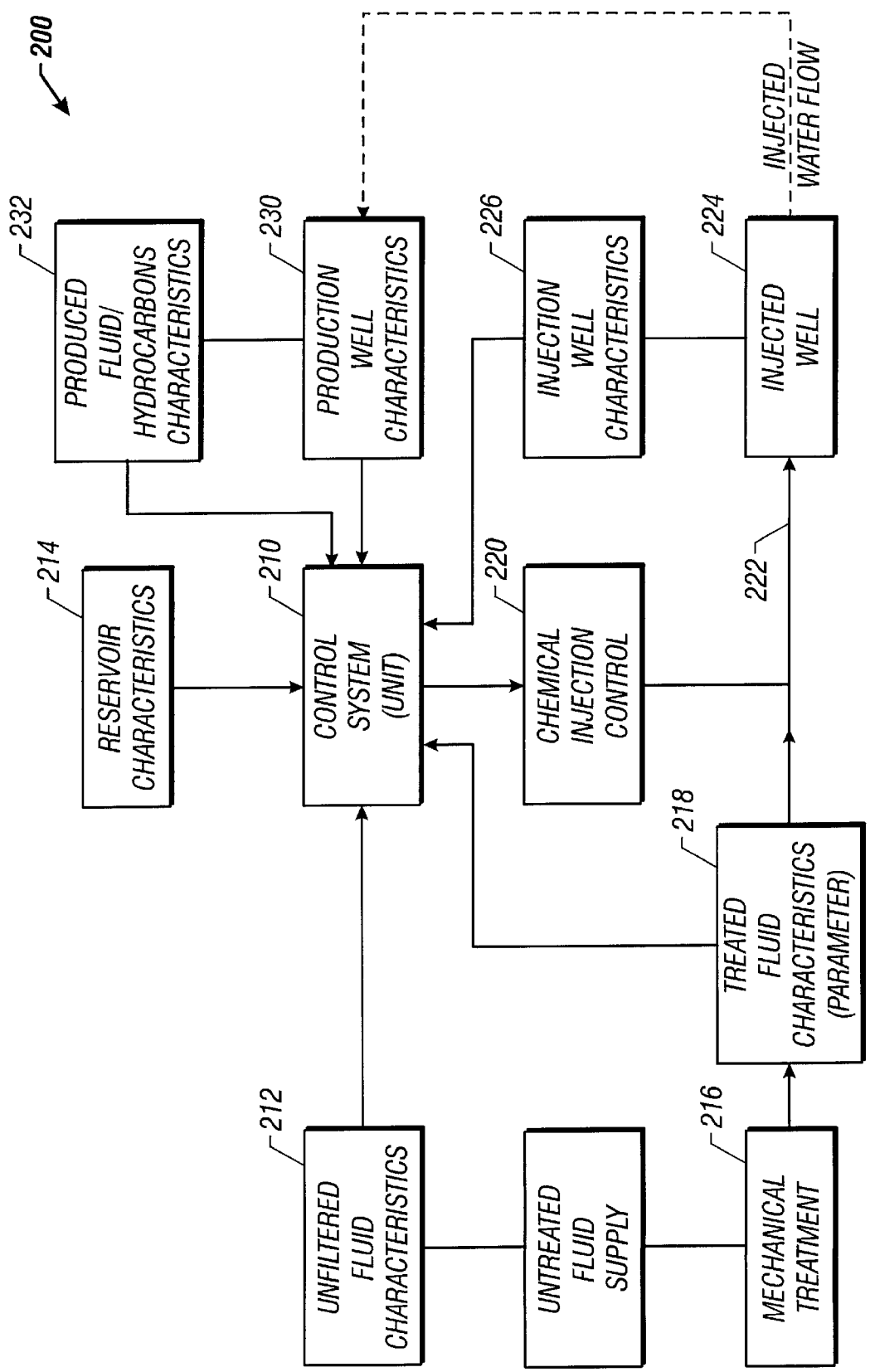
FIG. 2 is a functional block diagram of a closed-loop decision-making system for use in the system of FIG. 1.

FIG. 2 shows a functional block diagram of a closed loop decision-making system 200 for use in the injection system 100 shown in FIG. 1. The system 200 includes a control system or unit 210. Prior to the beginning of the injection process, characteristics 212 of the untreated fluid, precursor ion concentration and other characteristics of the filtered injection water 218, and the reservoir characteristics, obtained from prior reservoir information or test results from the production well are provided to the control system 210. The control system 210, utilizing models provided thereto, determines the initial types of chemicals or additives, their respective injection amounts, and the timing of the injection.

To initiate the injection process, the untreated water is first mechanically filtered at 216 by a nano-filtration membrane and the characteristics (including the concentration of the precursor ions) of the filtered water are determined at 218. The chemical injection control 220 injects the chemicals in accordance with their initial settings. The mixture 222 of the filtered water and chemicals is injected under pressure into the injection well 224. Injection well characteristics are obtained during the injection process at 226. Such characteristics include production fluid flow rate, production well pressure, etc. The control system 210 determines whether the combination of the filtration and the injection of the chemicals is producing the desired effect. If not, it determines alternative types and/or amounts of the chemicals.

As the injection continues, the injected fluid starts to move the formation fluids toward the production well. The injected fluid starts to replace the formation fluid. This alters the fluid characteristics of the formation. As the injection continues, the system 200 monitors the characteristics of the production well 230 (temperature, pressure, flow rate etc.), and the characteristics of the produced hydrocarbons 232, all of which are provided to the control system 210. The control system 210, based on the various inputs and programmed instructions (including the prediction models) provided thereto, and the amount of formation fluid displaced, periodically or continuously determines the types and amounts of the chemicals required to inhibit in-situ growth of insoluble salts. The control system 210 then causes the addition of such chemicals into the filtered water. The various characteristics or parameters described herein may be measured by utilizing any available sensors and/or by lab testing.

Thus, in one aspect, the present system provides a closed loop system for monitoring and controlling the treatment of injection water and the addition of chemicals into injection wells in a manner that prevents the plugging of the fluid passageways, during the entire injection process.

While the foregoing disclosure is directed to the preferred embodiments and processes of the present invention, various modifications will be apparent to those skilled in the art. It is intended that all variations within the scope and spirit of the appended claims be embraced by the foregoing disclosure.

What is claimed is:

1. A method of enhancing production of hydrocarbons from a hydrocarbon-bearing formation through a production well by injecting fluid into a subsurface injection zone located spaced apart from the production well, said method comprising:

mechanically treating water containing a first concentration of precursor ions to produce a treated water containing a second concentration of said precursor ions, said second concentration being less than the first concentration;

selecting at least one additive and determining an amount thereof for injection into said injection zone based on the second concentration of the precursor ions and at least one characteristic of the reservoir, said amount of said at least one additive being sufficient to inhibit in-situ growth of crystals due to interaction between said second concentration of precursor ions in said treated water and resident ions in said reservoir that tend to plug formation passageways; and injecting under pressure said treated water and the amount of said at least one selected additive into the injection zone to enhance the production of hydrocarbons from the reservoir through the production well.

2. The method of claim 1 further comprising:
(i) determining a second amount of said at least one additive after injecting said treated water into said subsurface injection zone; and
(ii) injecting the second amount of said at least one selected additive into said injection zone.

3. The method of claim 1 further comprising at least periodically determining the type of the at least one selected additive and the amount thereof based on a prediction model and injecting said periodically determined type and amount of said at least one additive into said injection zone.

4. The method of claim 1 wherein the at least one characteristic of the reservoir is selected from a group consisting of (i) concentration of at least one resident ion of the reservoir; (ii) subsurface pressure; (iii) subsurface temperature, (iv) porosity of the reservoir, and (v) permeability of the reservoir.

5. The method of claim 1, wherein mechanically treating water includes filtering said water by a nano-filtration membrane to filter a substantial portion of precursor ions from said water.

6. The method of claim 1, wherein injecting additive includes injecting said additive into the treated water.

7. The method of claim 1 further comprising determining at least one characteristic of said production well.

8. The method of claim 7, wherein the at least one characteristic of the production well is selected from (i) a concentration of salt in the fluid produced by said production well, (ii) flow rate of the fluid produced by said production well, and (iii) pressure at a selected location of the production well.

9. The method of claim 7 further comprising determining the at least one selected additive based on the at least one characteristic of the production well.

10. The method of claim 1 wherein said water is one of (i) sea water and; (ii) brine produced from a subsurface location.

11. A method of recovering hydrocarbons from a subsurface hydrocarbon-bearing formation having fluid passageways therein, said method comprising:

treating water containing a first concentration of precursor ions to produce a treated water containing a second concentration of said precursor ions, wherein the first concentration is greater than the second concentration;

determining amount of an additive required to prevent in-situ growth of crystals from insoluble salt precipitates that would be formed if said treated water is injected into said hydrocarbon-bearing formation, said determination made based at least partially on a characteristic of said hydrocarbon-bearing formation and the second concentration of said precursor ions; and injecting said treated water and said additive into an injection well formed spaced apart from a production well to produce said hydrocarbons from said production well.

12. A system for enhancing production of hydrocarbons present in a subsurface hydrocarbon bearing formation through a production well penetrating said reservoir by injecting fluid into a subsurface injection zone located spaced apart from said production well, comprising:

(a) a mechanical treatment unit treating an injection water containing a first concentration of precursor ions to a produce treated water containing a second concentration of said precursor ions, said second concentration being less than said first concentration;

(b) a chemical injection unit injecting at least one additive said at least one additive in an amount thereof determined from a prediction model based on said second concentration of said precursor ions and at least one characteristic of said reservoir, said at least one additive and the amount thereof being sufficient to inhibit in-situ growth of insoluble salts formed due to interaction of said second concentration of said precursor ions and resident ions in the reservoir.

13. The system of claim 12 further comprising a device measuring at least one characteristic of the production well.

14. The system of claim 13 wherein said system utilizes the at least one characteristic of the production well to update the at least one selected additive and injects the updated additive into the injection zone.

15. The system of claim 12, wherein the system injects the at least one selected additive into the treated water prior to the injection of the treated water into the injection zone.

16. The system of claim 12, wherein the at least one reservoir characteristic is selected from a group consisting of (i) concentration of at least one resident ion of the reservoir; (ii) subsurface pressure; (iii) subsurface temperature, (iv) porosity of the reservoir, and (v) permeability of the reservoir.

17. The system of claim 12 wherein said system periodically determines a new amount of said at least one additive based on at least one of said reservoir characteristic or a production well characteristic during the injection of said water into said injection zone and injects said new amount of said additive into said injection zone.

* * * * *